United States Patent
Silver et al.

[11] Patent Number: 5,881,541
[45] Date of Patent: Mar. 16, 1999

[54] CROP HEADER GATHERERS WITH RETRACTABLE CROP CONVEYORS

[75] Inventors: Dennis P. Silver, Geneseo; John L. Vande Wiele, Moline; Orlin W. Johnson, Geneseo, all of Ill.

[73] Assignee: Case Corporation, Racine, Wis.

[21] Appl. No.: 792,152

[22] Filed: Jan. 31, 1997

[51] Int. Cl.$^6$ .............................. A01D 45/02; A01D 61/04
[52] U.S. Cl. .......................... 56/98; 56/82; 56/93; 56/119
[58] Field of Search ................................... 56/98, 59, 66, 56/69, 73, 74, 75, 77, 78, 80, 81, 82, 84, 86, 87, 88, 92, 93, 94, 96, 106, 108, 118, 119

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,227,368 | 10/1980 | Mossman et al. . |
| 4,266,394 | 5/1981 | Van Ginhoven et al. ................... 56/94 |
| 4,269,017 | 5/1981 | deBuhr et al. . |
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

*Farm Show*, vol. 20, No. 5, 1996—"Build–It–Yourself" Narrow Row Header Kit.
*Farm Industry News*, vol. 29, No. 11, 1996—"Does Narrow Row Corn Add Up?".
*Ontario Farmer*, vol. 29, No. 40, 1996—"Thinking 15–Inch".
1000 Series Corn Head, Operators Manual, 1995 Case Corporation.
1000 Series Corn Head, Parts Catalog, 1993 Case Corporation.
Allis–Chalmers Tractor Division–Milwaukee, U.S.A., "1918–1960, An Informal History", Copyright 1989 by Alan C. King.
Operators Manual, Setting Up Instructions, "McCormick 34HM–21 Corn Snapper (Two Row, Mounted Type)", International Harvester Company (Date unknown).
Instruction Manual and Parts List, "Snapping Unit Frame Field Improvement Parts for McCormick–Deering, No. 14P, No. 24, Corn Pickers", International Harvester Company (Date Unknown).
CP–8 McCormick Parts Catalog, "34HM–20 Corn Picker, 34HM–21 Corn Snapper, 34HM–22 Sweet Corn Picker (Two–Row, Mounter–Type)", International Harvester Company (Date unknown).

*Primary Examiner*—Terry Lee Melius
*Attorney, Agent, or Firm*—Foley & Lardner

[57] ABSTRACT

A crop header for a harvesting machine includes a frame, a reciprocating support coupled to the frame and a crop conveyor pivotally coupled to the reciprocating support.

23 Claims, 14 Drawing Sheets

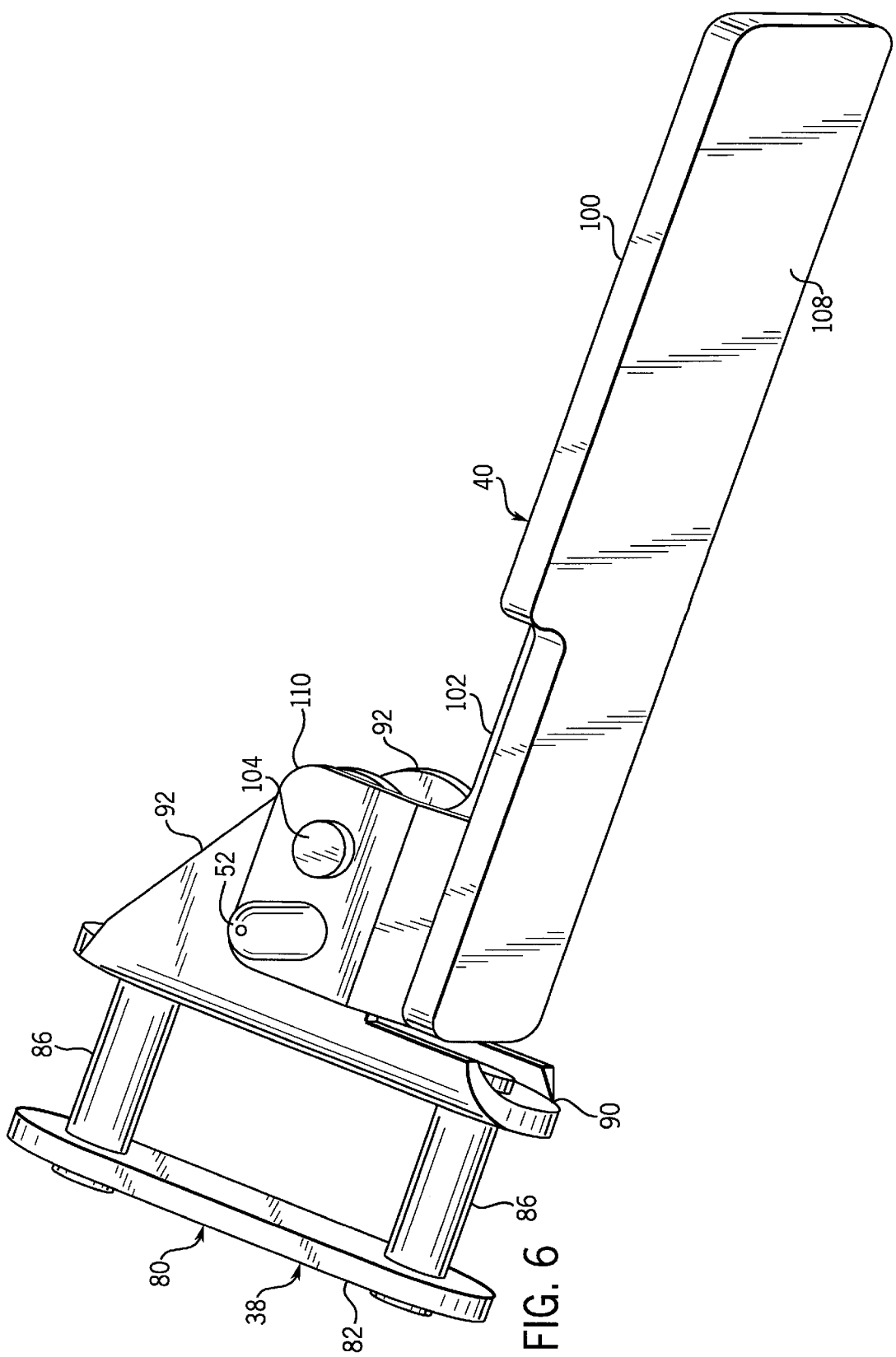

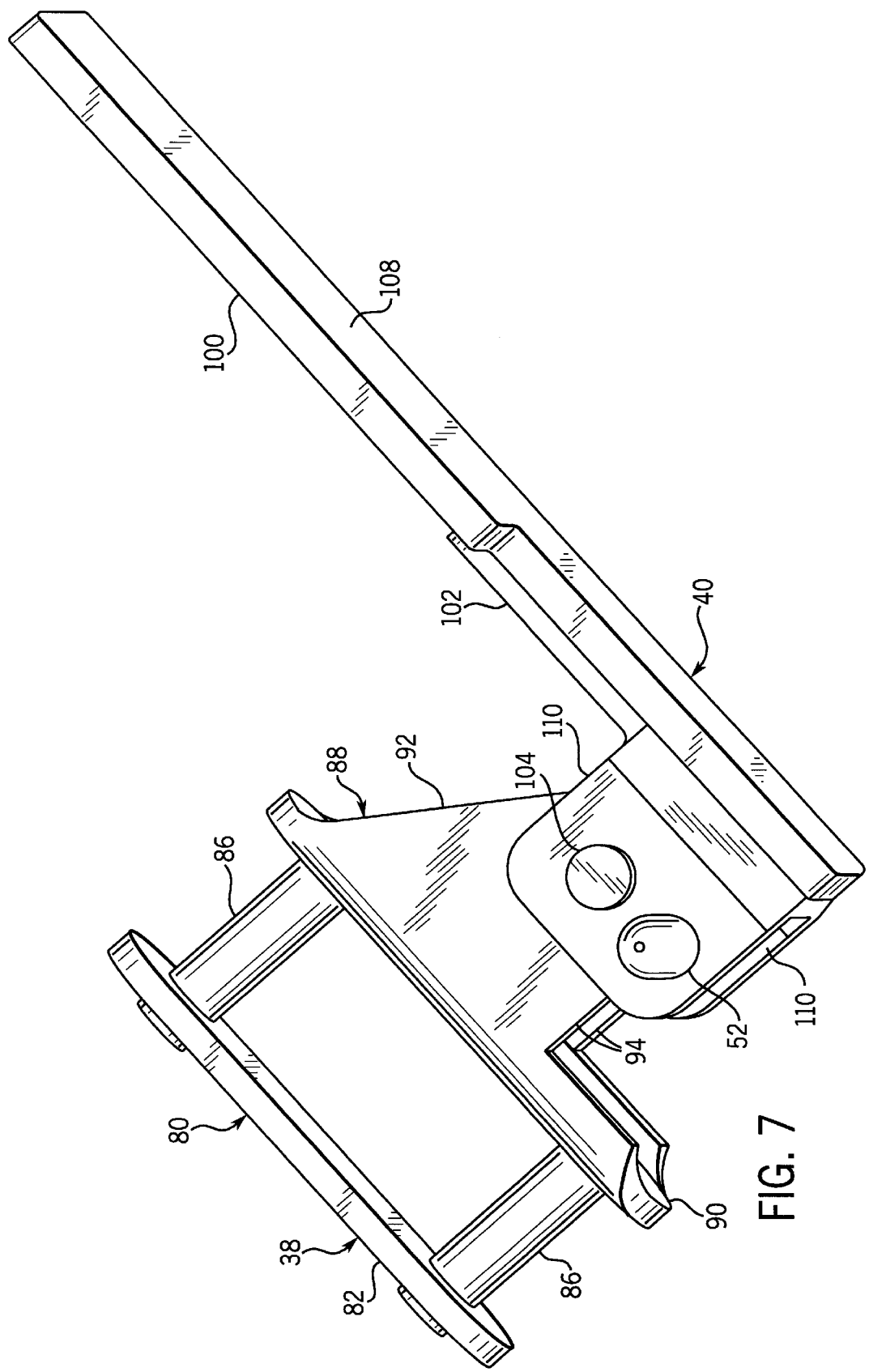

5,881,541

CROP HEADER GATHERERS WITH RETRACTABLE CROP CONVEYORS

FIELD OF THE INVENTION

The present invention relates to crop headers for harvesting machines. In particular, the present invention relates to a crop header including at least one gatherer having retractable crop conveyors. BACKGROUND OF THE INVENTION Several variations of header units are commonly used in combines or harvesting machines for harvesting row crops such as corn and cotton. One such header unit is a corn head with fixed spacing between the row units. Several other corn heads allowing variable spacing between the row units have also been developed. However, both fixed and variable spacing corn heads are designed to efficiently harvest corn planted in only rows having a row width of greater than 20 inches.

Recent research on the spacing of the corn rows has indicated special benefits for narrower row spacings that are 12–16 inches apart. In addition to the obvious increase in yield and crop population, these benefits include improved erosion control and better weed control. The narrower rows also require less chemicals and pesticides per unit of yield, thereby benefitting the environment.

Unfortunately, existing header units are not designed to harvest rows having a spacing of 16 inches or less. Moreover, modifying existing header units to effectively harvest rows having spacing of 16 inches or less is difficult, if not impossible. The ability to modify existing header units for row widths of 16 inches or less is inherently limited by the size of row unit components. For example, row units typically include gatherers adapted for contacting and moving corn ears or other harvested crop into the header unit. The conventionally required spacing of the gatherers limits constructing row units closer together for harvesting rows of crops having a spacing of 16 inches or less. Consequently, existing header units are very wasteful and inefficient in harvesting narrow rows leading to a sub-optimal harvesting efficiency.

SUMMARY OF THE INVENTION

The present invention is an improved crop header for a harvesting machine. The crop header includes a frame, a reciprocating support supported by the frame and a crop conveyor pivotally coupled to the support.

In a more preferred embodiment, the crop header additionally includes means for selectively pivoting the crop conveyor. Preferably, the means for selectively pivoting the crop conveyor include a cam follower surface coupled to the crop conveyor and a cam surface coupled to the frame for engaging the cam follower surface to selectively pivot the crop conveyor. In one preferred embodiment, the frame supports the reciprocating support in a horizontal plane. In yet another embodiment, the frame supports the reciprocating support in a substantially vertical plane. In the most preferred embodiment, the reciprocating support supports the crop conveyor proximate a row unit. The row unit preferably includes at least one stripper plate and at least one stalk roll cooperatively supported by the frame to separate a plant portion from a respective plant stalk.

BRIEF DESCRIPTION OF THE DRAWINGS

FIG. 6 is an enlarged perspective view of a crop conveyor in an extended position.

FIG. 7 is a perspective view of the crop conveyor in a retracted position.

DETAILED DESCRIPTION OF THE PREFERRED EMBODIMENTS

Figure 1:
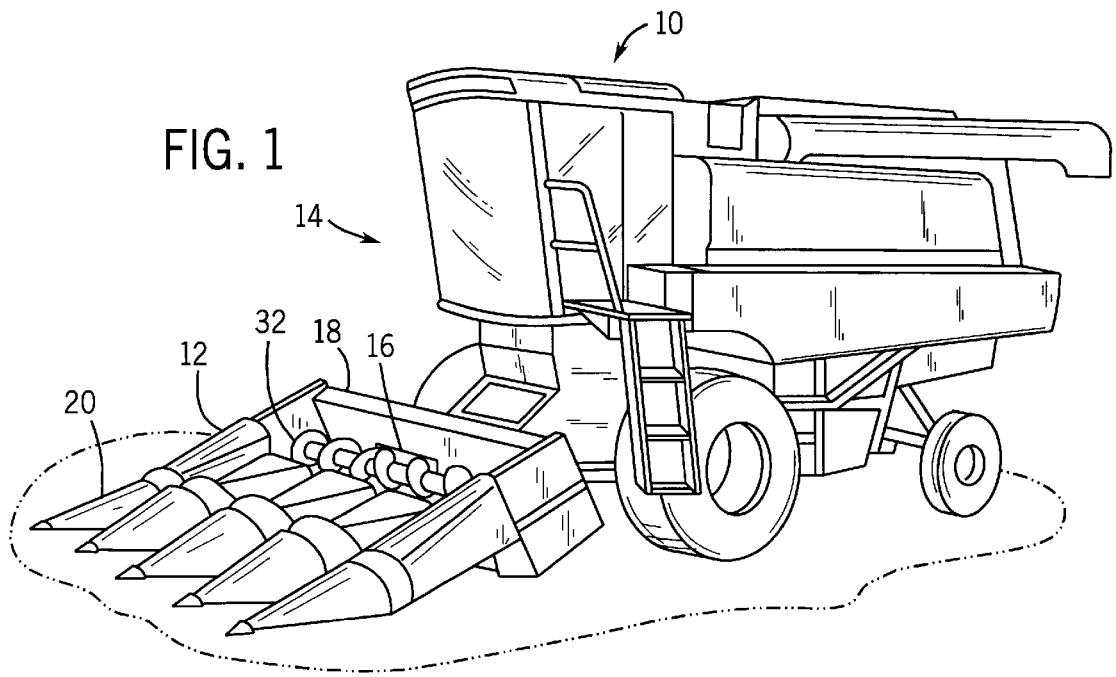
FIG. 1 is a perspective view of a harvesting machine including a header.
Figure 2:
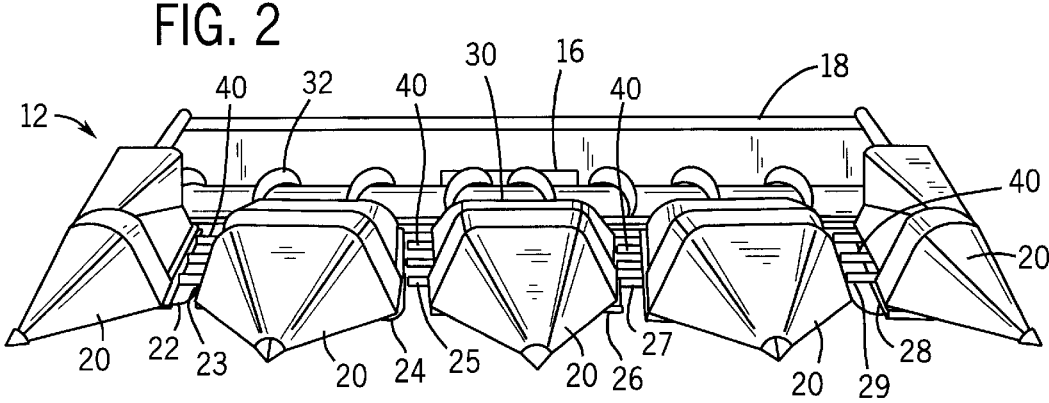
FIG. 2 is a front perspective view of the header of FIG. 1.

FIGS. 1 and 2 illustrate harvesting machine 10 including header 12. FIG. 1 is a perspective view of harvesting machine 10 mounted to header 12. FIG. 2 is a front perspective view of header 12. Harvesting machine 10 comprises a conventionally known combine having a front end 14 configured from mounting header 12 and receiving harvested crops from header 12 through a central intake 16. As is conventionally known, harvesting machine 10 comprising a combine includes a threshing mechanism for separating the grain or seeds from the remaining straw or chaff. Alternatively, header 12 may be used with a variety of other harvesting machines used for harvesting row crops such as corn pickers and the like.

Header 12 is a row crop harvesting head designed for harvesting multiple crop rows. In the preferred embodiment illustrated, header 12 is a corn head designed for moving ears of corn from respective stalks and for conveying the removed ears of corn to central intake 16 of harvesting machine 10. As shown by FIG. 2, header 12 generally includes frame 18, divider shields 20, row units 22, 24, 26, and 28, gatherers 23, 25, 27 and 29, gatherer hoods or shields 30 and cross conveyor 32. Frame 18 is a generally rigid, elongate support structure configured for being mounted to forward end 14 of harvesting machine 10 and for supporting row units 22, 24, 26, and 28, gatherers 23, 25, 27, and 29 and cross conveyor 32, as well as the other components of header 12. As can be appreciated, frame 18 may have a variety of alternative sizes and configurations depending upon the type of harvesting machine to which header 12 is attached, the particular type of row crops being harvested and the number of row units supported by frame 18.

Divider shields 20 are conventionally known and extend forward and between adjacent row units 22, 24, 26, and 28. In the preferred embodiment illustrated, divider shields 20 comprise semi-conical shaped members having noses pointing forward of header 12. Divider shields 20 are supported by frame 18 proximate to the ground surface for lifting cornstalks above the ground surface and for channeling or funneling the corn rows to an intermediate row unit 22, 24, 26, or 28.

Row units 22, 24, 26, and 28 are supported by frame 18 between adjacent or consecutive divider shields 20 transversely across header 12. In the preferred embodiment illustrated, row units 22, 24, 26, and 28 are closely spaced across header 12. Preferably, row units 22, 24, 26, and 28 are spaced apart from one another by a distance no greater than 16 inches for enabling row units 22, 24, 26, and 28 to harvest narrower crop rows with increased harvesting efficiency. Each row unit 22, 24, 26, and 28 longitudinally extends rearwardly from divider shields 20 toward cross conveyor 32. Each row unit 22, 24, 26, and 28 is designed for receiving the corresponding rows of corn channeled by divider shields 20 and for removing the ears of corn from their respective stalks.

Gatherers 23, 25, 27, and 29 are supported by frame 18 adjacent row units 22, 24, 26, and 28, respectively. Each gatherer 23, 25, 27, and 29 is partially housed by a gatherer shield 30 extending above and partially over the gatherer. Gatherers 23, 25, 27 and 29 convey ears of corn from row units 22, 24, 26, and 28 to cross conveyor 32 and include a plurality of crop conveyors 40 which pivot so as to not interfere with corresponding conveyors 40 of an adjacent gatherer and so as to not interfere with the rearward conveyance of crops towards cross conveyor 32. As a result, row units 22, 24, 26 and 28 may be more closely spaced to accommodate narrower crop rows with improved harvesting efficiency.

Cross conveyor 32 preferably comprises an elongate auger rotatably mounted at opposite ends to frame 18. Cross conveyor 32 transversely extends across and adjacent to ends of gatherers 23, 25, 27 and 29 so as to receive the corn ears conveyed by gatherers 23, 25, 27 and 29. Upon being rotated by a conventional drive mechanism, cross conveyor 32 conveys ears of corn from gatherers 23, 25, 27 and 29 to central intake 16 of harvesting machine 10. Although cross conveyor 32 is illustrated as an auger including oppositely wound vanes for conveying the ears of corn to intake 16, cross conveyor 32 may alternatively comprise any one of a variety of well-known conveying mechanisms such as moving webs or crop conveyors, and the like. As can be appreciated, cross conveyor 32 may be omitted in headers having a limited number of row units and a reduced width.

Figure 3:
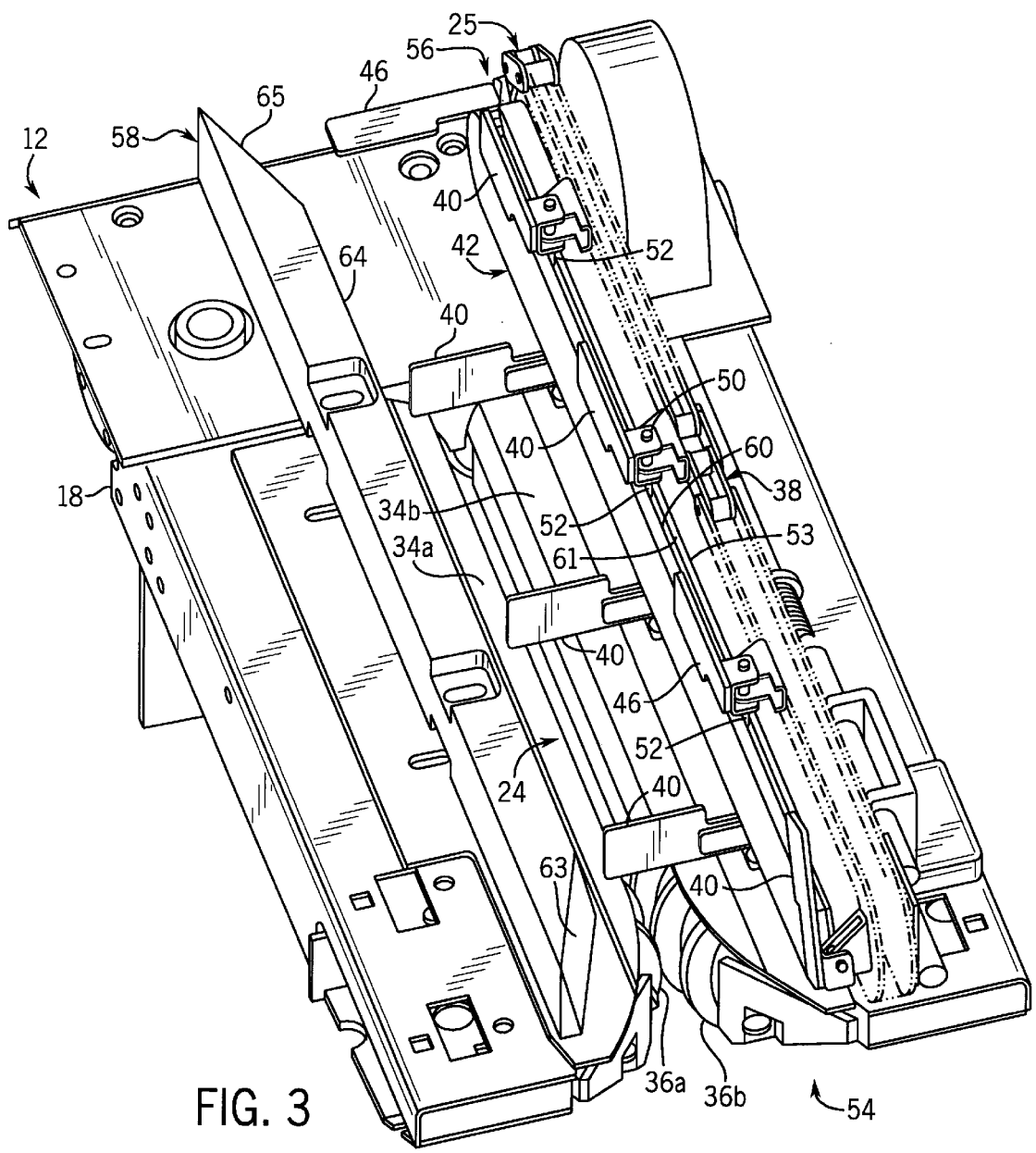
FIG. 3 is a perspective view of a row unit and an adjacent gatherer including a reciprocating support, a crop conveyor and a cam.

FIG. 3 is a perspective view illustrating a portion of frame 18, row unit 24 and gatherer 25 in greater detail. Row units 22, 26, 28 and gatherers 23, 27 and 29 are substantially similar to row unit 24 and gatherer 25 illustrated. As shown by FIG. 3, row unit 24 generally includes stripper plates 34a and 34b and snapping or stalk rolls 36a and 36b. Stripper plates 34a and 34b generally comprise elongate flat plates or bars supported by frame 18 along a length of row unit 24. Stripper plates 34a and 34b are spaced opposite one another for receiving corn stalks therebetween. Stripper plates 34a and 34b are preferably adjustable for varying the spacing between stripper plates 34a and 34b to accommodate various harvesting conditions.

Stalk rolls 36a and 36b are conventionally known and are rotatably coupled to frame 18 below stripper plates 34a and 34b. Upon being oppositely rotated by drive mechanism (not shown), in a conventionally known manner, stalk rolls 36a and 36b engage corn stalks to move the corn stalks toward and between stripper plates 34a and 34b. Stalk rolls 36a and 36b additionally drag and pull the corn stalks downward between stripper plates 34a and 34b to strip ears of corn from the corn stalks. The removed ears of corn are then conveyed by gatherer 25 rearwardly from divider shields 20 towards cross conveyor 32 (shown in FIGS. 1 and 2).

Gatherer 25 is mounted to frame 18 along and above row unit 24 and generally includes reciprocating support 38, crop conveyors 40 and cam 42. Reciprocating support 38 supports crop conveyors 40 and alternatively carries crop conveyors 40 rearwardly from front end 54 towards rear end 56, and forwardly from rear end 56 toward front end 54. In the preferred embodiment, crop conveyor 40 engages crops while reciprocating support 38 carries conveyors 40 rearwardly from front end 54 towards rear end 56. Once the engaged crops are released at rear end 56 for further conveyance by cross conveyor 32 (shown in FIGS. 1 and 2), reciprocating support 38 returns conveyors 40 to front end 54 for conveying additional crops rearwardly.

Crop conveyors 40 are generally elongate protuberances outwardly extending from support 38. Crop conveyors 40 each define a crop conveying surface sufficiently sized and oriented for engaging crops and carrying crops rearwardly from divider shields 20 towards cross conveyor 32 (shown in FIGS. 1 and 2). In the preferred embodiment illustrated, crop conveyors 40 preferably have a length sufficient so as to extend substantially across stripper plates 34a and 34b of row unit 24 so as to independently carry all of the crops to be conveyed from row unit 24 to cross conveyor 32 (shown in FIGS. 1 and 2). Alternatively, crop conveyors 40 may have a length sufficient so as to only extend across stripper plate 34b of row unit 24 and partially between stripper plate 34b and stripper plate 34a. In such an alternative arrangement, header 12 preferably includes an additional gatherer substantially identical to gatherer 25 facing gatherer 25 on an opposite side of row unit 24.

Crop conveyors 40 are pivotally coupled to reciprocating support 38 to enable crop conveyors 40 to pivot about a pivot axis 50 between a first extended position in which conveyors 40 engage and carry crops and a second retracted position in which conveyors 40 are pivoted out of engagement with crops. In the preferred embodiment illustrated, crop conveyors 40 additionally include a cam follower 52 in engagement with cam 42 for selectively pivoting crop conveyors 40 between the first and second positions.

Cam 42 is a member supported by frame 18 adjacent to crop conveyors 40. Cam 42 preferably extends adjacent to row unit 24 along the entire length of row unit 24. Cam 42 preferably extends from divider shields 20 to cross conveyor 32. In the preferred embodiment illustrated, cam 42 is a generally elongate parabolic shaped bar supported by frame 18 along a generally vertical plane within the outer perimeter of reciprocating support 38. Cam 42 includes at least one cam surface configured for engaging cam follower 52 of each crop conveyor 40 to control the pivoting of crop conveyors 40 between the first and second positions. In the preferred embodiment illustrated, cam 42 includes an elongate channel or groove 53. Groove 53 encircles the entire outer perimeter of cam 42 and is sized for receiving cam follower 52 of each crop conveyor. Groove 53 includes inner side surface 60 and outer side surface 61. Inner side surface 60 and outer side surface 61 cooperatively engage cam follower 52 of each crop conveyor to selectively control the pivoting of each crop conveyor along the length of cam 42. In the preferred embodiment illustrated, surfaces 60 and 61 of groove 53 cooperatively engage cam follower 52 of each crop conveyor so as to maintain each crop conveyor in the first extended position as each crop conveyor 40 is carried rearwardly from divider shields 20 towards cross conveyor 32 by reciprocating support 38. Surfaces 60 and 61 additionally engage cam follower 52 so as to pivot each crop conveyor from the first extended position to the second retracted position proximate rear end 56 adjacent cross conveyor 32. While reciprocating support 38 carries each crop conveyor from rear end 56 towards front end 54, surfaces 60 and 61 engage cam follower 52 to maintain each crop conveyor 40 in the second retracted position. Finally, surfaces 60 and 61 engage cam follower 52 to pivot each crop conveyor from the second retracted position back to the first extended position proximate the front end 54.

As a result, cam 42 engages cam follower 52 of each crop conveyor to selectively pivot each crop conveyor 40 between the first extended position and the second retracted position while reciprocating support 38 reciprocatively carries crop conveyors 40 in opposite directions along row unit 24. In particular, cam 42 pivots and maintains crop conveyors 40 in an extended position as reciprocating support 38 carries crop conveyors 40 in a rearward direction so as to extend outward to engage and carry crops rearwardly from divider shields 20 towards cross conveyor 32. Conversely, cam 42 pivots and maintains crop conveyors 40 in the second retracted position while reciprocating support 38 returns crop conveyors 40 to front end 54. Because cam 42 maintains crop conveyors 40 in the second retracted position while reciprocating support 38 returns crop conveyors 40 from rear end 56 to front end 54, crop conveyors 40 do not engage or interfere with crops being moved rearwardly from front end 54 to rear end 56. Moreover, crop conveyors 40 do not engage or interfere with opposing conveying surfaces moving in an opposite direction. As a result, adjacent gatherer units 23, 25, 27, and 29 (shown in FIG. 2) may be supported by frame 18 in a more closely spaced arrangement, enabling row units 22, 24, 26 and 28 to also be more closely spaced for accommodating narrower crop row spacings with improved harvesting efficiency.

Although cam 42 is illustrated as a single parabolic shaped bar having a groove 53 for receiving cam follower 52 of each crop conveyor, each gatherer unit 23, 25, 27 and 29 may alternatively have any one of a variety of different cam mechanisms including various cam surfaces in engagement with cam follower surfaces coupled to crop conveyors 40. For example, cam follower 52 may comprise any shaped member extending from a crop conveyor. Similarly, cam 42 may include any of a variety of differently shaped members defining surfaces in engagement with cam follower 52. Cam 42 may also include a plurality of members having surfaces which engage different surfaces of crop conveyors 40 to control the pivoting of each crop conveyor 40.

As further shown by FIG. 3, gatherer 25 additionally includes a crop channeling bar 58 supported by frame 18 adjacent to and along row unit 24 opposite gatherer 25. Crop channeling bar 58 is a generally elongate member mounted to frame 18 extending from front end 54 to rear end 56. Bar 58 defines surfaces 63, 64 and 65. Surfaces 63, 64 and 65, at least indirectly face gatherer 25 on an opposite side of the row unit 24. Surfaces 63, 64, and 65 funnel and maintain crops in engagement with crop conveyors 40 while crop conveyors 40 move rearwardly from front end 54 to rear end 56 in the first extended position. In the preferred embodiment, surface 63 forwardly converges towards row unit 24 and gatherer 25 to channel crops to row unit 24 and gatherer 25. Surface 65 rearwardly diverges away from row unit 24 and gatherer 25 to channel crops to cross conveyor 32. Alternatively, header 12 may include an additional gatherer opposite gatherer 25 for also conveying crops rearwardly from front end 54 towards rear end 56 of row unit 24. In such an alternative configuration, the additional gatherer would preferably be substantially identical to gatherer 25, but would be supported by frame 18 such that the conveyors of the additional gatherer would not interfere with crop conveyors 40 of gatherer 25.

Figure 4:
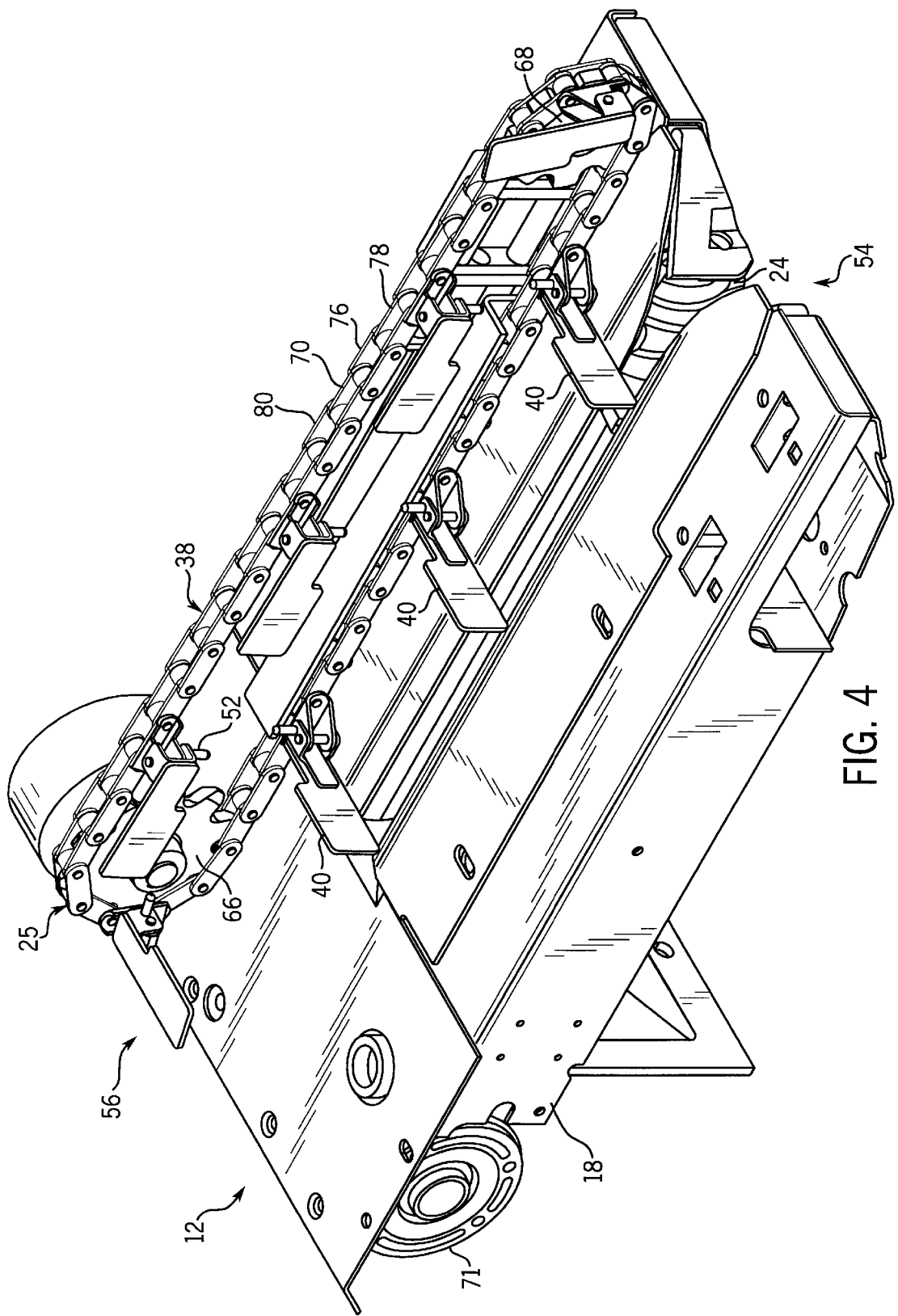
FIG. 4 is a perspective view of the row unit and the adjacent gatherer with the cam removed.
Figure 5:
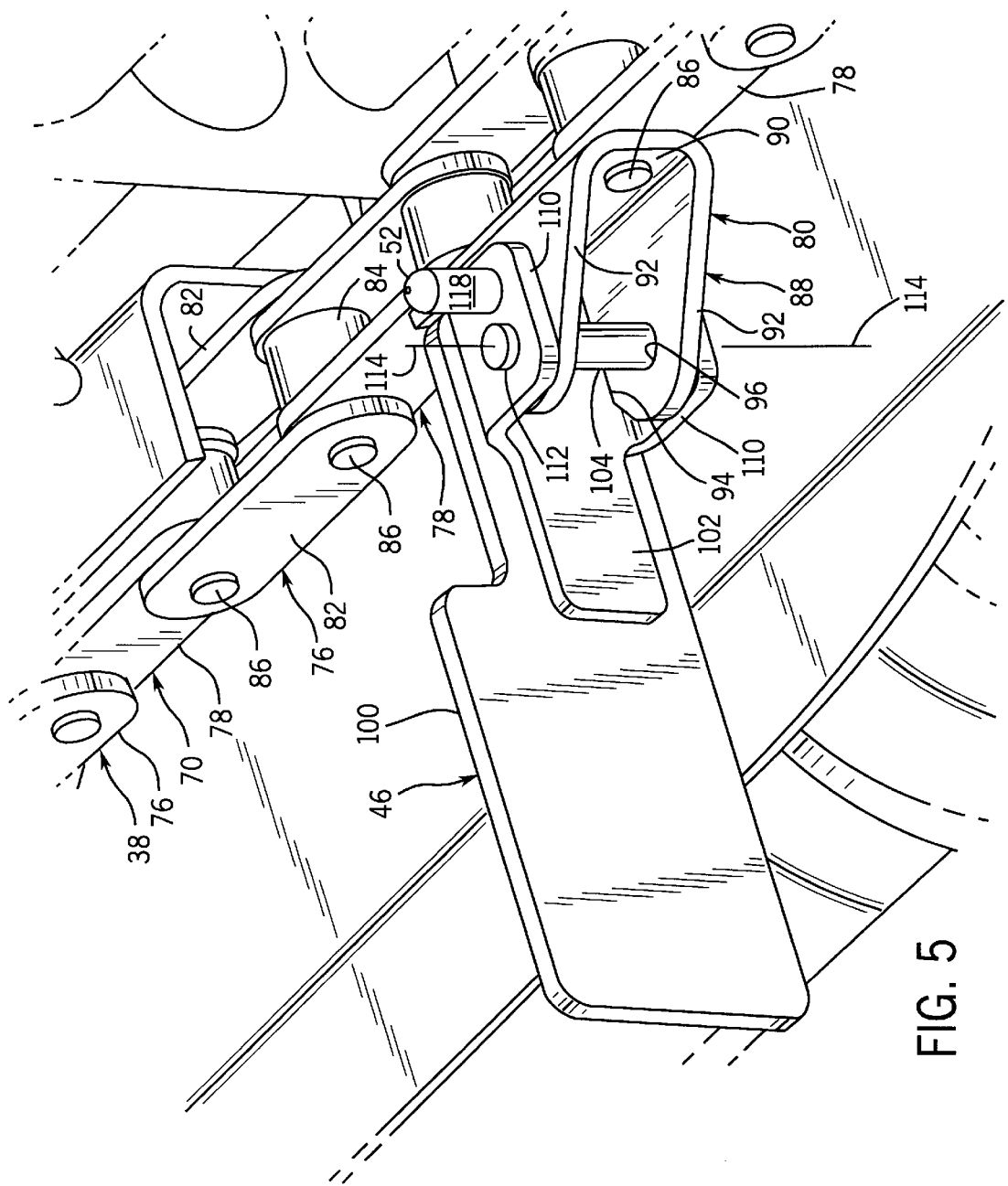
FIG. 5 is an enlarged perspective view of a portion of the row unit and the adjacent gatherer with the cam removed.

FIGS. 4–7 illustrate reciprocating support 38 and crop conveyors 40 in greater detail. FIG. 4 is a perspective view of a portion of header 12 illustrating gatherer 25 with cam 42 and channeling bar 58 removed for purposes of illustration. FIG. 5 is an enlarged perspective view illustrating an individual crop conveyor 40 pivotally coupled to reciprocating support 38. FIG. 6 is an enlarged perspective view of an individual crop conveyor 40 in the first extended position. FIG. 7 is an enlarged perspective view of an individual crop conveyor 40 in the second retracted position. As shown by FIG. 4, reciprocating support 38 generally includes drive wheel 66, follower wheel 68 and endless support 70. Drive wheel 66 is supported by frame 18 and is coupled between a conventionally known crop header drive mechanism 71 and endless support 70. Drive mechanism 7 is connected to drive wheel 66 by conventional gearing to drive wheel 66 and to rotate endless support 70 about drive wheel 66. In the preferred embodiment illustrated, drive wheel 66 comprises a drive sprocket having teeth engaged with links of endless support 70. As can be appreciated, drive wheel 66 may have a variety of alternative configurations depending upon the particular type of endless support 70 employed by gatherer 25. For example, drive wheel 66 may alternatively comprise a pulley or sheave for driving a belt endless support member.

Follower wheel 68 is an idler rotatably coupled to frame 18 and configured for supporting endless support 70. Follower wheel 68 cooperates with drive wheel 66 to support endless support 70 in an elongate, preferably parabolic, shape adjacent to and along row unit 24. In the preferred embodiment illustrated, drive wheel 66 and follower wheel 68 support endless support 70 in a substantially vertical plane. Follower wheel 68 preferably comprises a sprocket having teeth engaging corresponding links within endless support 70. As can be appreciated, follower wheel 68 may have a variety of alternative configurations depending upon the type of endless support 70 employed by gatherer 25. For example, follower wheel 68 may alternatively comprise a pulley or sheave when endless support 70 alternatively comprises a belt.

Endless support 70 is a generally elongate, relatively flexible endless member supported by and encircling drive wheel 66 and follower wheel 68. Endless support 70 is configured for engaging drive wheel 66 so as to be driven by drive wheel 66 in a continuous fashion about drive wheel 66 and follower wheel 68. Endless support 70 rotates about the axes of drive wheel 66 and follower wheel 68 in a parabolic path adjacent to row unit 24. In the preferred embodiment illustrated, endless support 70 comprises an endless chain. Endless support 70 may alternatively comprise a variety of other endless support structures such as belts, ropes, and the like, configured for supporting crop conveyors 40.

Although reciprocating support 38 has been illustrated to include an endless support stretched between two wheels for reciprocatively carrying conveyors 40 between front end 54 and rear end 56, reciprocating support 38 may alternatively include other well known mechanical configurations for reciprocatively carrying conveyors 40 between the front end 54 and rear end 56. For example, reciprocating support 38 may alternatively include an elongate rigid support member carrying conveyors 40 and reciprocatively moved between front end 54 and rear end 56 by various well known mechanical arrangements, such as bell cranks, radius bars and the like.

As best shown by FIG. 5, endless support 70 includes a plurality of inter-connected and overlapping links 76, 78 and 80. Links 76 and 78 are conventionally known and generally comprise overlapping plates 82, spacers 84 and pins 86. Spacers 84 space apart plate 82 and receive pins 86 which pivotally couple links 76 and 78 together.

Link 80 is substantially identical to link 76 except that link 80 includes a support bracket 88 in lieu of one of plates 82. Support bracket 88 includes a mounting portion 90 and a pair of opposing ears 92. Mounting portion 90 is pivotally pinned between consecutive links 78 by pins 86. Mounting portion 90 pivotally couples bracket 88 to links 78 to permit the chain formed by links 76, 78 and 80 to wrap about and encircle wheels 66 and 68.

Ears 92 perpendicularly extend from mounting portion 90 opposite one another and are configured for pivotally supporting crop conveyors 40. Each ear 92 is preferably in the shape of a right triangle and includes a support surface 94 and a bore 96. Surfaces 94 of ears 92 are generally aligned with another for bracing against a portion of the crop conveyor 40 when the crop conveyor is in the first extended position. As a result, surfaces 94 stabilize and support crop conveyor 40 while the crop conveyors engage crops in the first extended position. Bores 96 extend through ears 92 and are aligned with another for receiving pin 104 of crop conveyor 40 to pivotally couple crop conveyor 40 to reciprocating support 38. As can be appreciated, bracket 88 may have a variety of alternative shapes and configurations for pivotally supporting the crop conveyor 40.

As further shown by FIG. 5, each crop conveyor 40 is pivotally coupled to support bracket 88 of reciprocating support 38 and preferably includes protuberance 100, protuberance mount 102, pivot pin 104 and cam follower 52. Protuberance 100 is a generally flat, elongate paddle defining a crop conveying surface 108 (shown in FIG. 6 and 7) sized for engaging and carrying crops with movement of crop conveyor 40 by reciprocating support 38. As can be appreciated, protuberance 100 may have a variety of alternative sizes, shapes, and configurations so long as protuberance 100 defines a sufficiently sized crop conveying surface 108 (shown in FIGS. 6 and 7). Protuberance 100 is fixedly coupled to mount 102. Alternatively, protuberance 100 and mount 102 may be integrally formed as a single unitary body.

Mount 102 extends from protuberance 100 and together with pivot pin 104, pivotally couples protuberance 100 to support bracket 88 of reciprocating support 38. Mount 102 includes a pair of opposing ears 110 which overlap and receive ears 92 of bracket 88. Ears 110 define a pair of aligned bores 112 sized for receiving pivot pin 104.

Pivot pin 104 is fixedly coupled to ears 110 of mount 102 and extends through bores 96 of ears 92 to pivotally couple Mount 102 and protuberance 100 relative to bracket 88. As a result, conveying surface 108 of protuberance 100 pivots about axis 114 of pin 104.

Cam follower 52 is fixedly coupled to crop conveyor 40 and is positioned for engaging a cam, such as cam 42 (not shown), to selectively pivot crop conveyor 40 about axis 114. Cam follower 52 defines a cam follower surface 118 that is radially offset from axis 114 for engaging a corresponding cam surface. Although cam follower 52 defining cam follower surface 118 is illustrated as a pin upwardly projecting from ear 110 of crop conveyor 40, cam follower 52 may alternatively have a variety of different shapes, configurations and positions for engaging a cam surface to selectively pivot crop conveyor 40.

FIGS. 6 and 7 illustrate crop conveyor 40 pivoted relative to link 80 between the first extended position (illustrated in FIG. 6) and the second retracted position (illustrated in FIG. 7). As shown by FIG. 6, crop conveying surface 108 extends generally perpendicular to link 80 of reciprocating support 38 in the first extended position. As shown by FIG. 7, crop conveying surface 108 extends generally parallel to link 80 in the second retracted position. Selective rotation of cam follower 52 about the axis of pin 104 pivots crop conveyor 40 about the axis of pin 104 to move crop conveying surface 108 of crop conveyor 40 between the first extended position and the second retracted position. In the preferred embodiment illustrated, rotation of cam follower 52 approximately 90 degrees about the axis of pin 104 pivots crop conveying surface 108 of crop conveyor 40 between the first extended position and the second retracted position.

Figure 8:
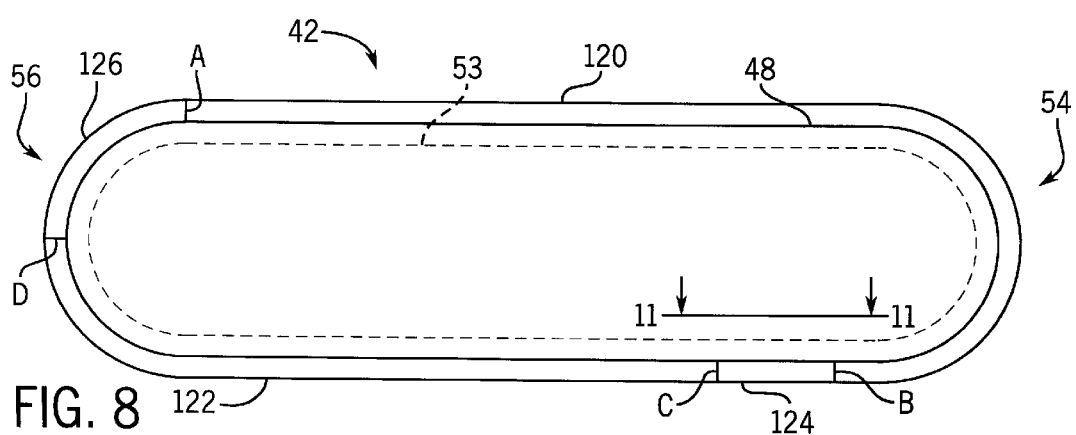
FIG. 8 is a side-elevational view of the cam.

FIG. 8 is a side elevational view of cam 42 illustrating groove 53 in greater detail. As shown by FIG. 8, groove 53 extends into cam 42 about an entire perimeter of cam 42. Groove 53 preferably has a depth and a width sufficient for receiving cam follower 52 of crop conveyors 40 such that surfaces 60 and 61 of groove 53 engage cam follower 52 to selectively pivot crop conveyors 40 so as to maintain crop conveyors 40 in a desired angular orientation relative to cam 42. In the preferred embodiment illustrated, groove 53 includes retraction segment 120, extension segment 122 and transition segments 124 and 126. Retraction segment 120 generally extends from proximate rear end 56 of cam 42 towards and around front end 54 of cam 42. In the preferred embodiment illustrated, retraction segment 120 extends from point A to point B about cam 42. Along retraction segment 120, groove 53 receives cam follower 52 (shown in FIG. 4–7) so as to maintain crop conveyors 40 in the second retracted position. As a result, along retraction segment 120, groove 53 maintains conveyors 40 in the second retracted position to prevent those conveyors 40 being forwardly carried by reciprocating support 38 from interfering with those conveyors 40 and crops being carried rearwardly by reciprocating support 38.

Extension segment 122 of groove 53 generally extends from point C proximate front end 54 of cam 42 to point D proximate rear end 56 of cam 42. Along extension segment 122, groove 53 receives cam follower 52 of each crop conveyor so as to maintain each crop conveyor in the first extended position while each crop conveyor is carried by reciprocating support 38 from point C to point D. As a result, groove 53 maintains crop conveyors 40 in the first extended position from point C to point D so that conveyors 40 engage and carry crops from front end 54 towards rear end 56.

Transition segment 124 generally extends between retraction segment 120 and extension segment 122. Along transition segment 124, groove 53 is configured so as to engage cam follower 52 of each conveyor so as to pivot each conveyor from the second retracted position to the first extended position.

Transition segment 126 extends between extension segment 122 and retraction segment 120. Along transition segment 126, groove 53 is configured so as to receive and engage cam follower 52 of each conveyor so as to pivot each conveyor from the first extended position to the second retracted position. As can be appreciated, the exact starting and ending locations of each segment of groove 53 may vary slightly depending upon the position of cam 42 relative to the adjacent row unit.

Figure 9:
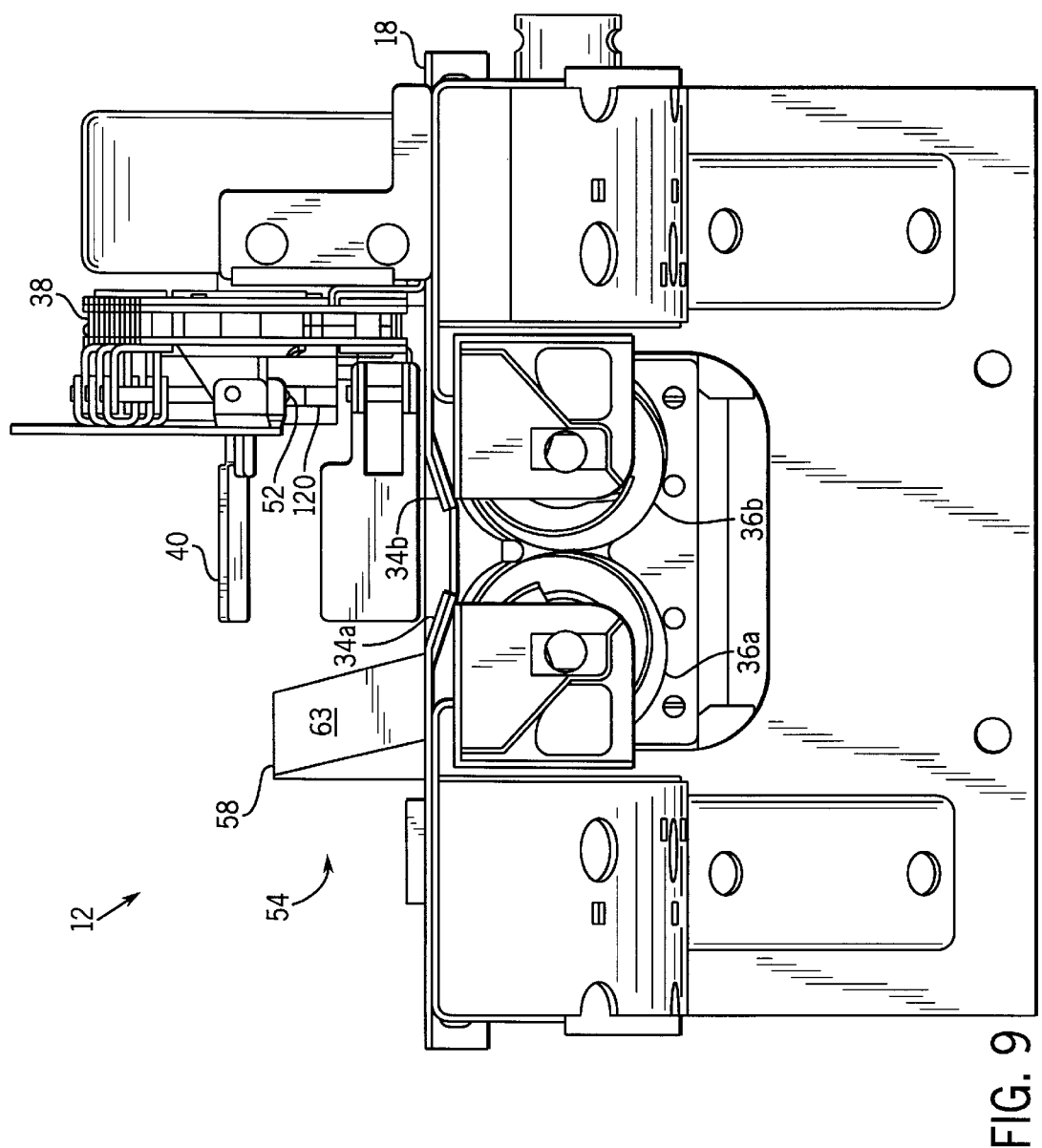
FIG. 9 is a front-elevational view of the row unit and the gatherer.
Figure 10:
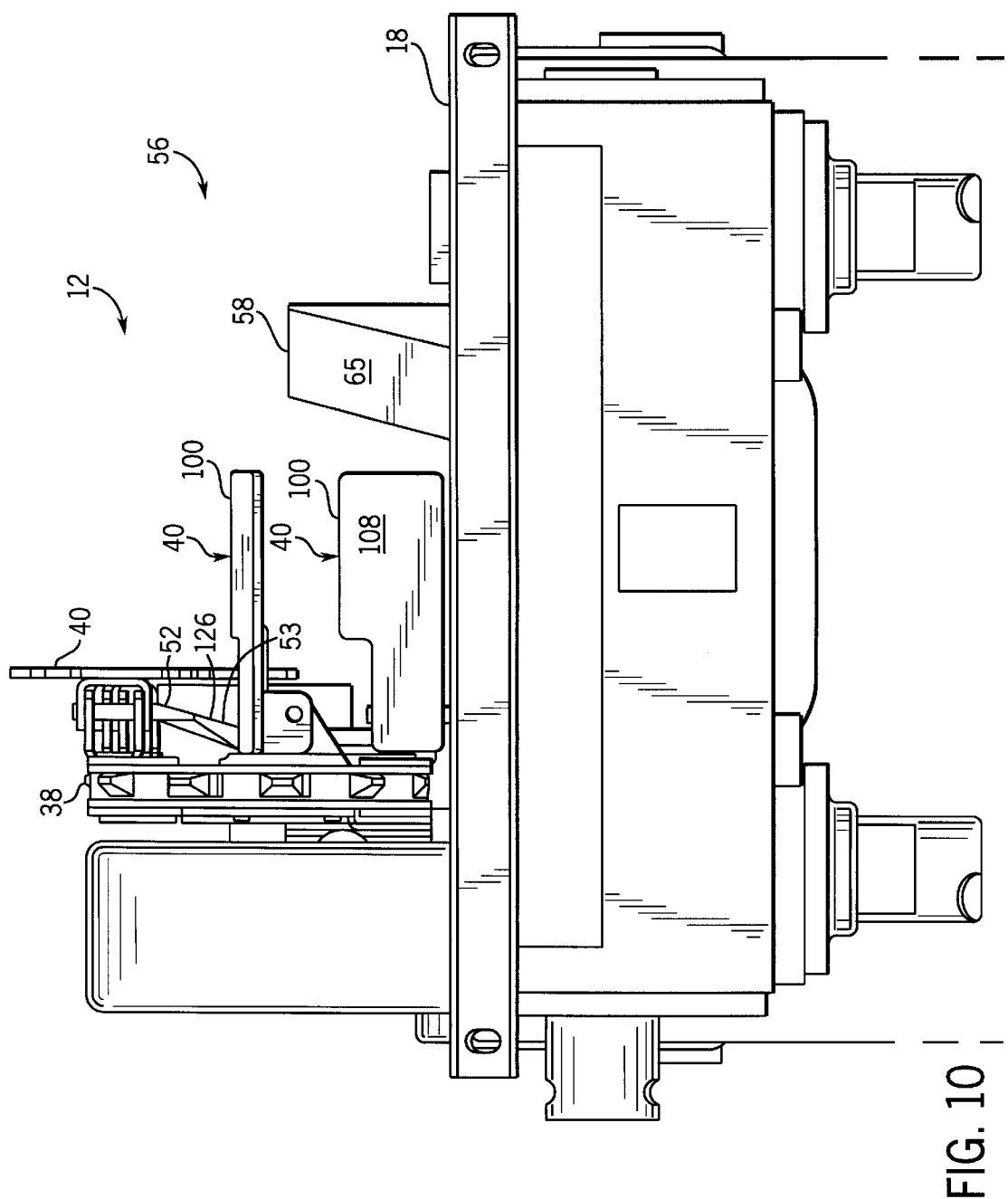
FIG. 10 is a rear-elevational view of the row unit and the gatherer.

FIGS. 9 and 10 illustrate cam 42 engaging cam follower 52 to pivot the crop conveyors 40 between the first extended position and the second retracted position. FIG. 9 is a front elevational view of gatherer 25 supported by frame 18 adjacent to row unit 24. As shown by FIG. 9, as each crop conveyor encircles front end 54 of cam 42, groove 53 receives and engages cam follower 52 to maintain each conveyor in the second retracted position along retraction segment 120. Once reciprocating support 38 finishes returning conveyor 40 to front end 54, groove 53 of cam 42 engages cam follower 52 along transition segment 124 so as to pivot crop conveyor 40 from the second retracted position to the first extended position to enable conveyor 40 to extend over row unit 24 for engaging crops and carrying crops from row unit 24 rearwardly towards cross conveyor 32 (shown in FIGS. 1 and 2).

FIG. 10 is a rear elevational view of gatherer 25 supported by frame 18 adjacent to row unit 24. As shown by FIG. 10, as each crop conveyor 40 is carried about rear end 56 of cam 42 by reciprocating support 38, groove 53 receives and engages cam follower 52 to pivot each conveyor 40 along transition segment 126 from the first extended position to the second retracted position to avoid interference with crops being rearwardly conveyed along row unit 24.

Figure 11:
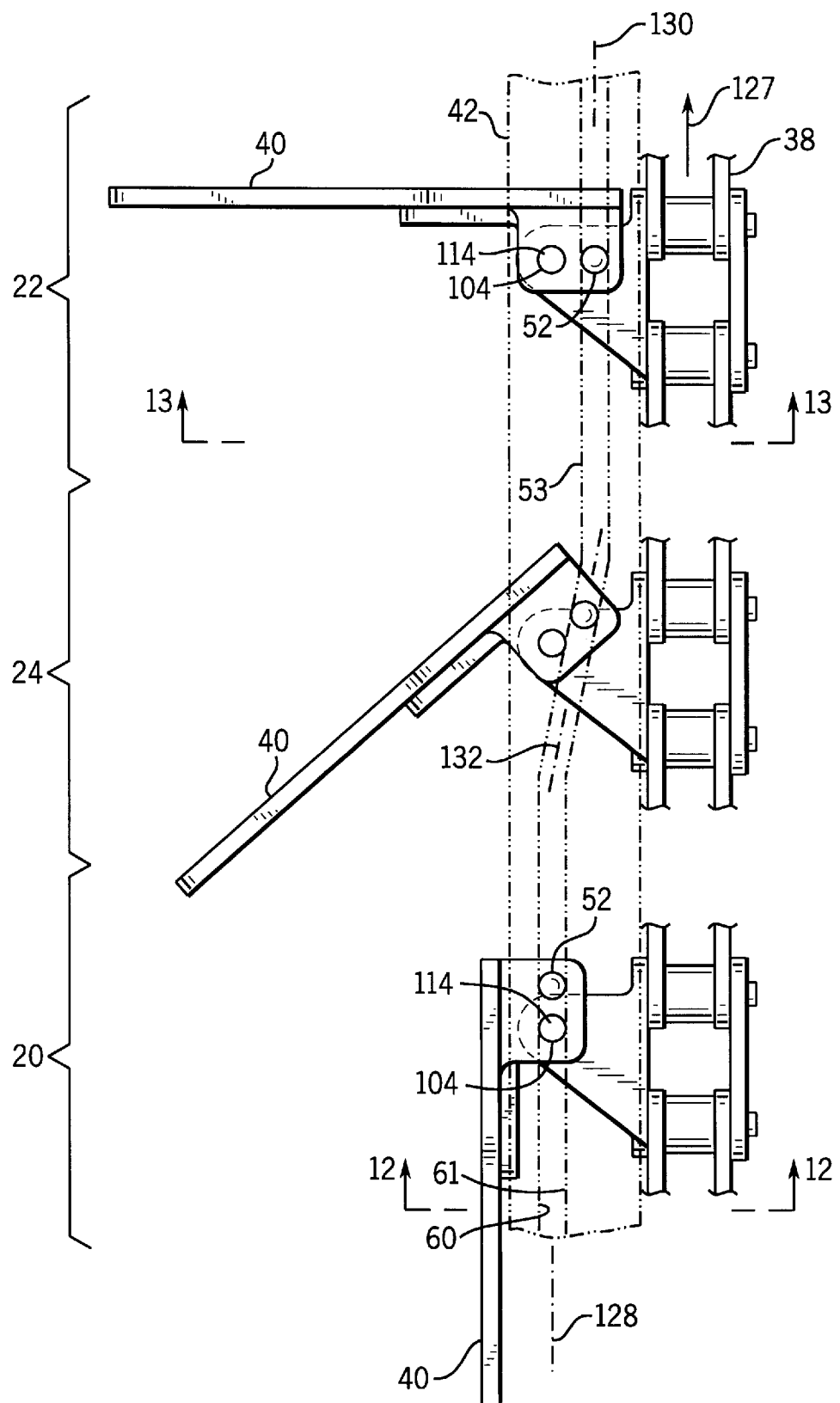
FIG. 11 is a sectional view schematically illustrating the cam engaging the crop conveyor.
Figure 12:
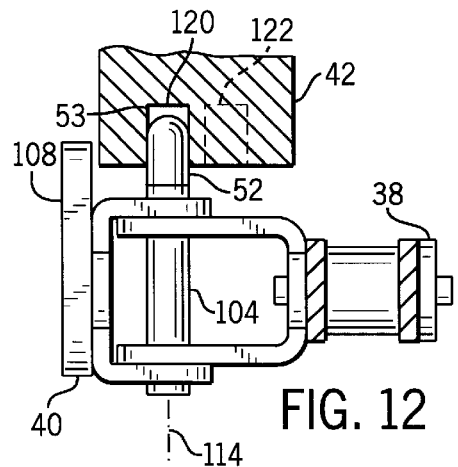
FIG. 12 is a cross-sectional view of the cam engaging the crop conveyor in the retracted position.
Figure 13:
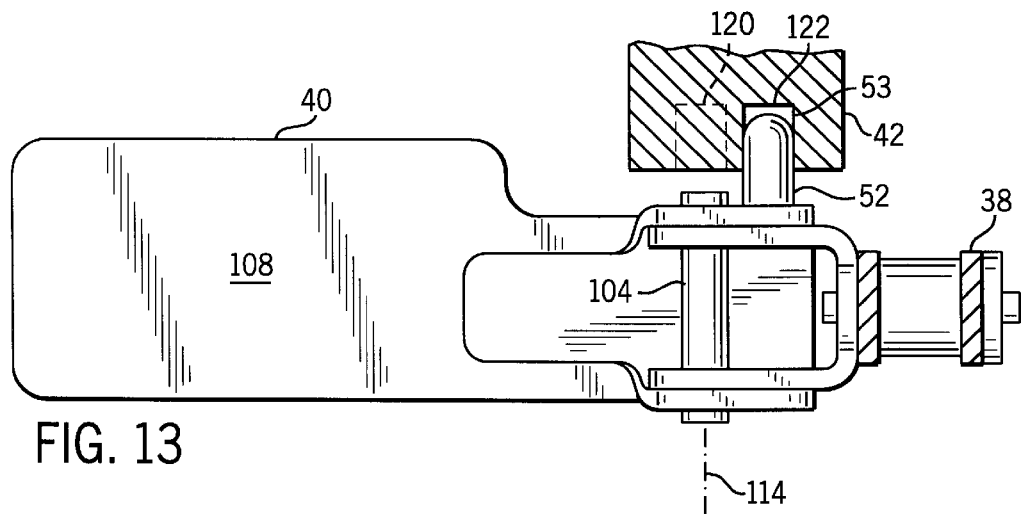
FIG. 13 is a cross-sectional view of the cam engaging the crop conveyor in the extended position.

FIGS. 11–13 schematically illustrate groove 53 of cam 42 receiving and engaging crop conveyors 40 along segments 120, 122 and 124. As shown by FIG. 11, reciprocating support 38 extends along bar 58 of cam 42 and carries crop conveyor 40 in a direction indicated by arrow 127. As shown by FIGS. 11 and 12, along retraction segment 120, groove 53 extends along an axial centerline 128 which intersects axis 114 of pivot pin 104 and which extends parallel to the movement of reciprocating support 38 and conveyor 40. As a result, cam follower 52 which is received within groove 53 also moves along centerline 128 at a 90 degree angle (a 12:00 o'clock position) relative to axis 114 of pin 104. As a result, cam 42 maintains conveyor 40 at a constant orientation about axis 114 so that conveyor 40 extends generally parallel to link 80 and generally parallel to centerline 128 in the second retracted position.

Along transition segment 124, groove 53 angularly extends along a centerline 132 oblique to centerlines 128 and oblique to movement of reciprocating support 38. As a result surfaces 60 and 61 of groove 53 engage cam follower surface 118 of cam follower 52 to pivot conveyor 40 in a clockwise direction between the first extended position and the second retracted position.

As shown by FIGS. 11 and 13, along extension segment 122, groove 53 extends along a centerline 130 offset relative to axis 114 of pivot pin 104 and parallel to the movement of reciprocating support 38 and conveyor 40. As a result, cam follower 52 which is received within groove 53 also moves along centerline 130 at approximately 180 degrees (a 3:00 o'clock position) relative to axis 114 of pin 104. As a result, cam 42 maintains conveyor 40 at a constant orientation about axis 114 so that conveyor 40 extends generally perpendicular to link 80 and generally perpendicular to centerline 130 in the first extended position.

As shown by FIG. 10, transition segment 126 of groove 53 is similar to transition segment 124 of groove 53 in that along transition segment 126, groove 53 angularly extends oblique to the movement of reciprocating support 38 and conveyor 40. As a result, surfaces 60 and 61 of groove 53 engage cam follower surface 118 of cam follower 52 to pivot conveyor 40 from the first extended position to the second retracted position.

Figure 15:
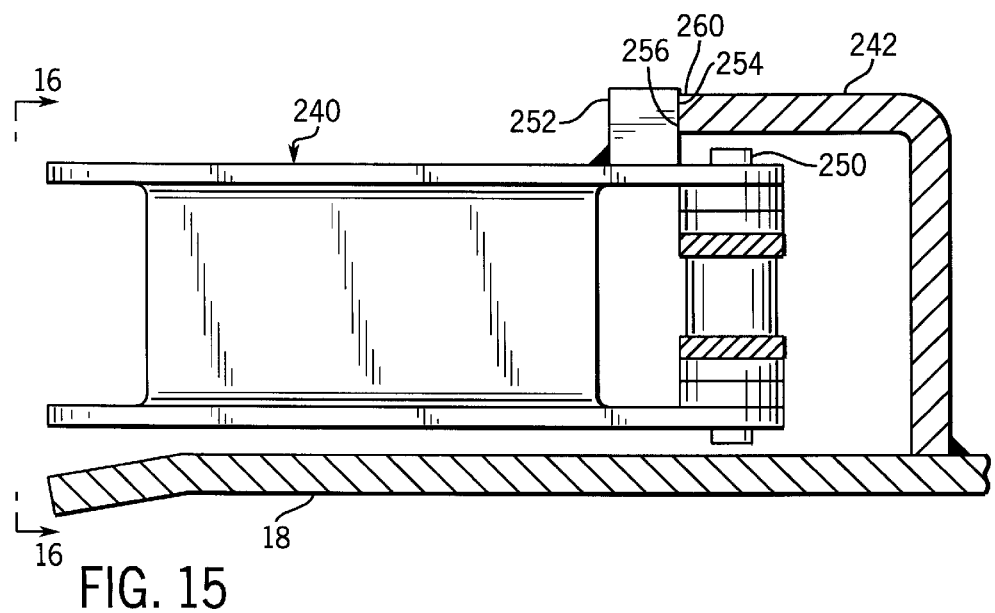
FIG. 15 is a sectional view of the gatherer of FIG. 14 taken along lines 15——15.
Figure 14:
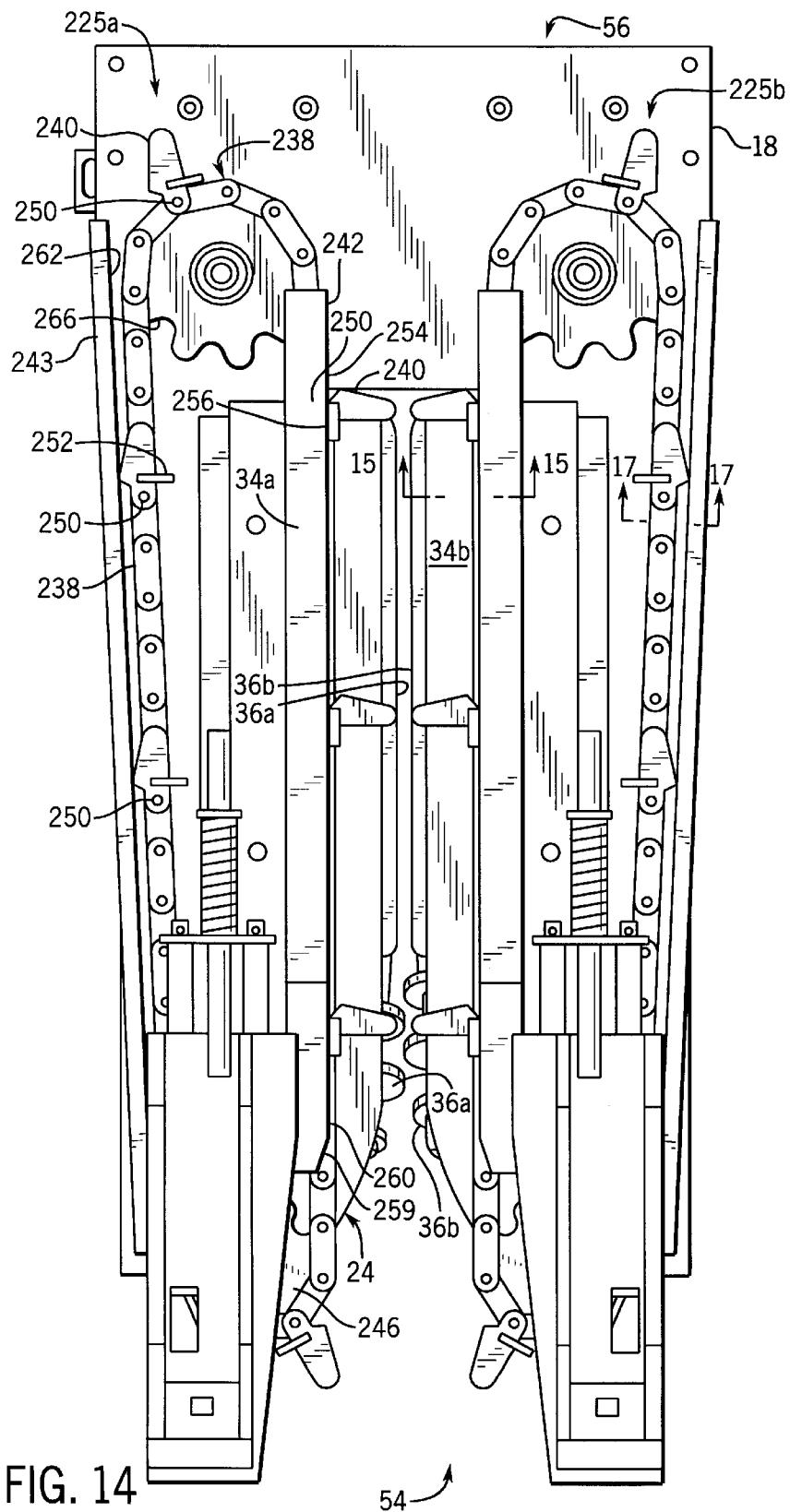
FIG. 14 is a top-elevational view of a first alternate embodiment of the gatherer adjacent a row unit.
Figure 16:
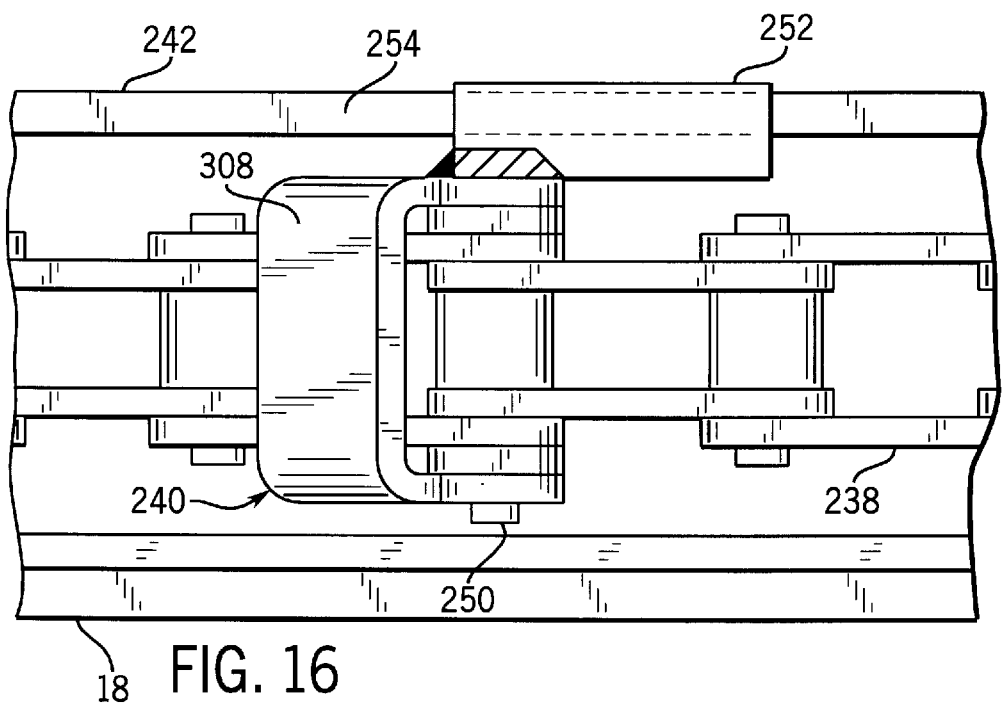
FIG. 16 is a fragmentary side elevational view of the gatherer of FIG. 14.
Figure 17:
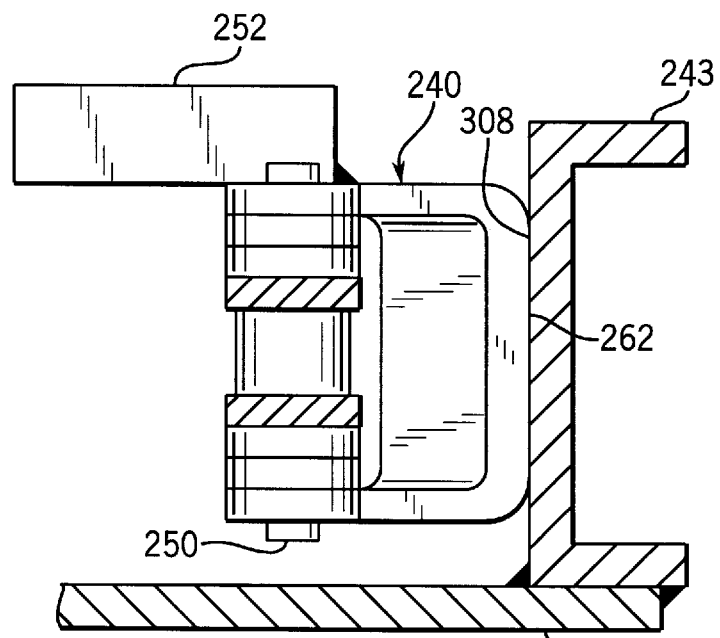
FIG. 17 is a cross-sectional view of the gatherer of FIG. 14 taken along lines 17——17.

FIGS. 14–17 illustrate gatherer units 225a, 225b, alternative embodiments of gatherer 25, supported by frame 18 adjacent to row unit 24. FIG. 14 is a top elevational view of gatherer units 225a and 225b adjacent row unit 24. FIG. 15 is a sectional view taken along lines 15——15 of FIG. 14 illustrating crop conveyor 240 in the first extended position. FIG. 16 is a side elevational view taken along lines 16——16 of FIG. 15. FIG. 17 is a sectional view taken along lines 17——17 of FIG. 14 illustrating crop conveyor 240 in the second retracted position. For ease of illustration, those elements of gatherers 225a and 225b which are similar to corresponding elements of gatherer 25 are numbered similarly. Gatherer units 225a and 225b are substantially identical to one another except that gatherer units 225a and 225b are supported by frame 18 on opposite sides of row unit 24 so as to face one another. Gatherer unit 225a generally includes reciprocating support 238, crop conveyors 240 and cams 242 and 243. Reciprocating support 238 supports crop conveyors 240 and alternatively carries crop conveyors 240 rearwardly from front end 54 towards rear end 56 and forwardly from rear end 56 toward front end 54. In the preferred embodiment illustrated, reciprocating support 38 carries conveyors 240 rearwardly from front end 54 towards rear end 56 while crop conveyors 240 engage crops. Once the engaged crops are released at rear end 56 for further conveyance by cross conveyor 32 (shown in FIGS. 1 and 2), reciprocating support 38 returns conveyors 40 to front end 54 for rearwardly conveying additional crops.

Reciprocating support 238 generally includes follower wheel 268, drive wheel 268 and endless support 270. Drive wheel 266 is rotatably supported by frame 18 proximate rear end 56 in engagement with endless support 270. Drive wheel 266 is preferably rotated by a conventional drive mechanism typically employed for driving conventional gatherer chains.

Follower wheel 268 is rotatably supported by frame 18 proximate front end 54 in engagement with endless support 270. Endless support 270 partially encircles and stretches about drive wheel 266 and follower wheel 268 for supporting crop conveyors 240 in a generally horizontal plane. Drive wheel 266 and follower wheel 268 cooperate with one another to support and drive endless support 270 about the axes of both drive wheel 266 and follower wheel 268 in a generally parabolic path within a substantially horizontally angled plane. In the preferred embodiment illustrated, reciprocating support 238 comprises a conventionally known sprocket driven chain assembly wherein follower wheel 268 and drive wheel 266 comprise sprockets and wherein endless support 270 comprises an elongate chain having a plurality of links engaged by teeth of drive wheel 266 and follower wheel 268.

Crop conveyors 40 generally comprise elongate protuberances having crop conveying surfaces 308. Conveyors 240 are pivotally coupled to endless support 270 about the axes of pins 250 to enable conveyors 40 to pivot between a first extended position and a second retracted position. Each crop conveyor includes a cam follower 252 having a cam surface 256 configured for engaging cam 242.

Cam 242 is a generally elongate bar supported by frame 18 adjacent and generally parallel to stripper plate 34a of row unit 24. Cam 242 defines a cam surface 254 configured for engaging cam follower surfaces 256 of cam followers 252. Cam surface 254 generally includes a ramp segment 259 and an extension segment 260. Ramp segment 259 rearwardly converges towards row unit 24 and engages cam follower surface 256 of cam follower 252 to pivot crop conveyor in a clockwise direction into the first extended position. Extension segment 260 generally extends rearwardly from ramp segment 259 towards rear end 56, generally parallel to the longitudinal axis of row unit 24. As best shown by FIGS. 15 and 16, extension segment 260 of cam surface 254 engages cam follower surface 256 of cam follower 252 to maintain conveyors 40 in the first extended position while reciprocating support 238 carries conveyors 240 from front end 54 towards rear end 56. As a result, cam 242 engages cam follower 252 to maintain conveyor in the extended position while conveyor engages crops and carries crops rearwardly along row unit 24 from front end 54 towards rear end 56.

As best shown by FIGS. 14 and 17, cam 243 is a generally elongate bar supported by frame 18 adjacent endless support 270 opposite cam 242. Cam 243 includes a cam surface 262 which is positioned so as to engage conveyors 40 to crop conveyors 240 about the axis of pin 250 in a counter-clockwise direction into the second retracted position. As best shown by FIG. 17, cam surface 262 additionally engages the conveying surface of each conveyor 240 to maintain each conveyor in the second conveyor retracted position as reciprocating support 38 carries conveyors 240 from rear end 56 towards front end 54. Because cam 243 maintains conveyors 240 in the second retracted position, conveyors 240 do not substantially extend outward so as to interfere with conveyors of adjacent gatherers along adjacent row units. As a result, adjacent gatherers and row units may be more closely spaced together to better accommodate narrower crop row spacings with improved harvesting efficiency.

Figure 18:
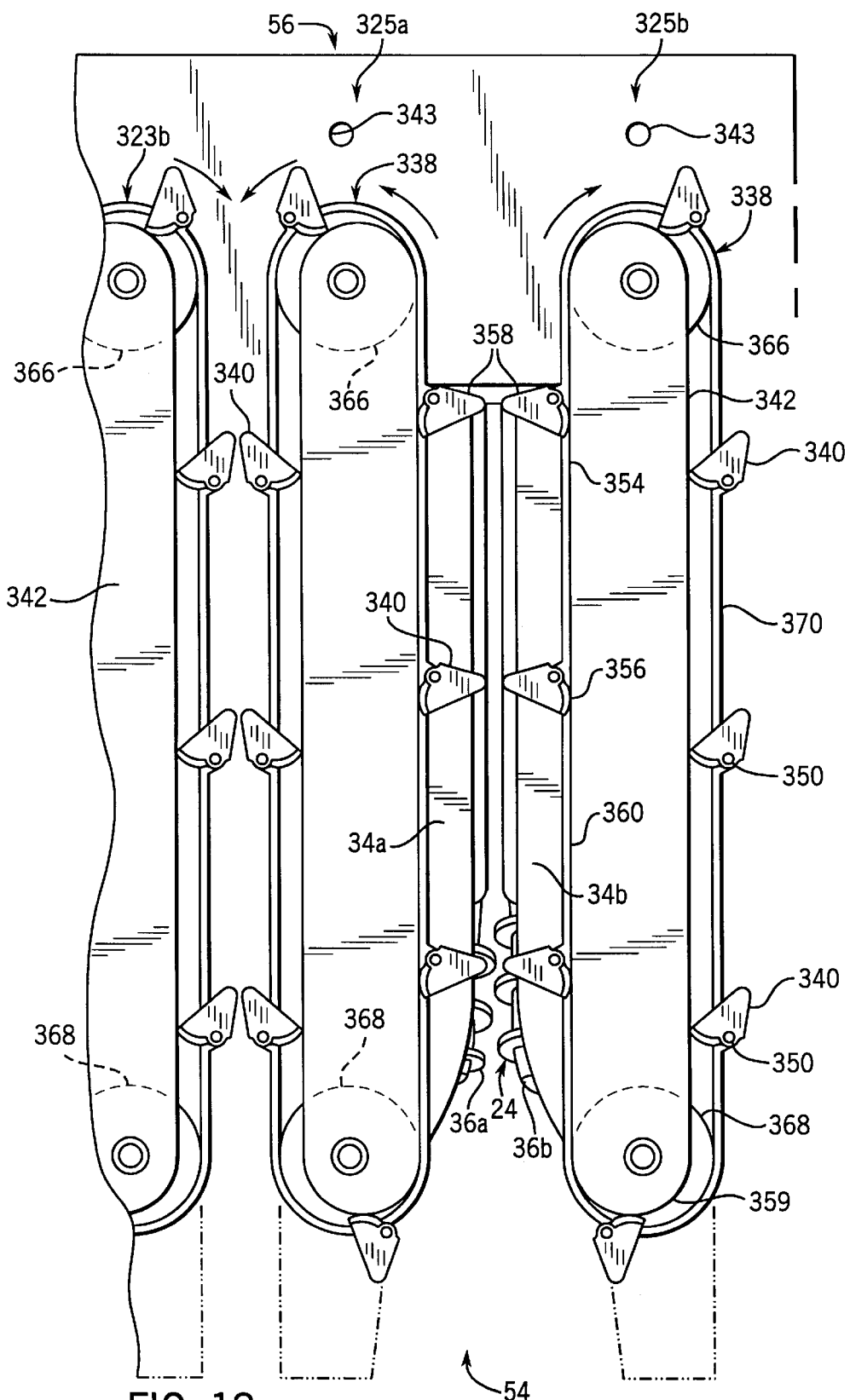
FIG. 18 is a top elevational view of a second alternate embodiment of the gatherer adjacent a row unit.
Figure 19:
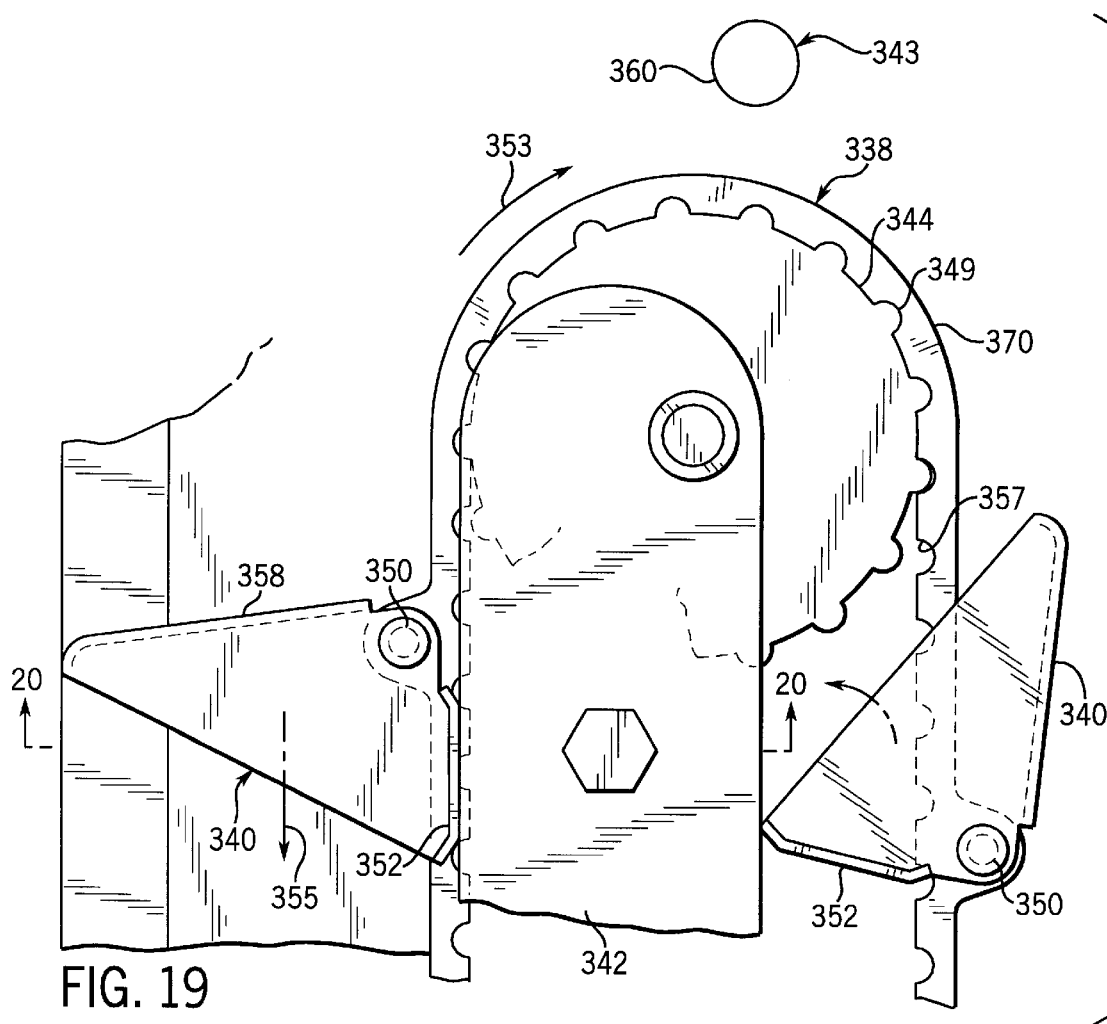
FIG. 19 is an enlarged fragmentary elevational view of the gatherer of FIG. 18.
Figure 20:
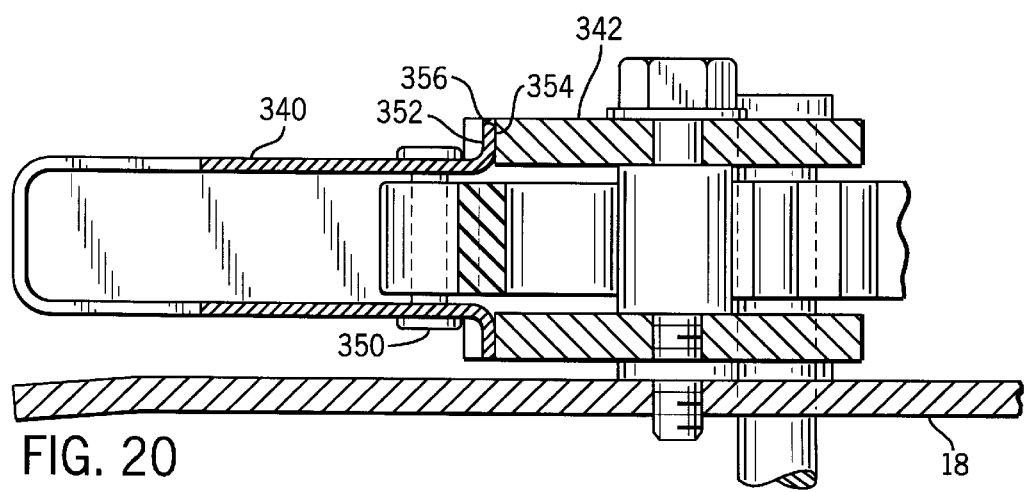
FIG. 20 is a cross-sectional view of the gatherer of FIG. 19 taken along lines 20——20.

FIGS. 18–20 illustrate gatherers 323b, 325a and 325b, alternate embodiments of gatherer units 225a and 225b illustrated in FIGS. 14–17. For ease of illustration, those elements of gatherers 325b, 325a and 325b which are the same as corresponding elements of gatherers 225a and 225b are numbered similarly. Gatherer 325a is substantially identical to gatherers 323b and 325b except that gatherer 325a is supported by frame 18 adjacent row unit 24 opposite gatherer 325b. Gatherer 325b is essentially identical to gatherer 323b except that gatherer 325b extends along row unit 24 whereas gatherer 323b extends along row unit 22 (shown in FIG. 2). Gatherer 325a generally includes reciprocating support 338, crop conveyors 340 and cams 342 and 343. Reciprocating support 338 supports crop conveyors 340 and alternately carries crop conveyors 340 rearwardly from front end 54 towards rear end 56, and forwardly from rear end 56 towards front end 54. In the preferred embodiment as illustrated, crop conveyors 340 engage crops while reciprocating support 338 carries conveyors 340 rearwardly from front end 54 towards rear end 56. Once the engaged crops are released at rear end 56 for further conveyance by cross conveyor 32 (shown in FIGS. 1 and 2), reciprocating support 338 returns conveyors 340 to front end 54 for rearwardly conveying additional crops.

In the preferred embodiment, reciprocating support 338 generally includes drive wheel 366, follower wheel 368 and endless support 370. Drive wheel 366 is rotatably supported by frame 18 proximate rear end 56 and in engagement with endless support 370. Drive wheel 366 is rotatably supported by frame 18 proximate rear end 56 in engagement with endless support 370. Drive wheel 366 is preferably rotated by a conventional drive mechanism typically employed for driving conventional gatherer chains.

Follower wheel 368 is rotatably supported by frame 18 approximate front end 54 and engagement with endless support 370. Endless support 370 partially encircles and stretches about drive wheel 366 and follower wheel 368 for supporting crop conveyors 340 in a generally horizontal plane. Drive wheel 366 and follower wheel 368 cooperate with one another to support and drive endless support 370 about the axes of both drive wheel 366 and follower wheel 368 in a generally parabolic path within a substantially horizontally angled plane. In the preferred embodiment illustrated, reciprocating support 338 comprises a conventionally known sprocket driven chain assembly, wherein drive wheel 366 and follower wheel 368 comprise sprockets and wherein endless support 370 comprises an elongate chain having a plurality of lengths engaged by teeth of drive wheel 366 and follower wheel 368.

Crop conveyors 340 generally comprise elongated protuberances having crop conveying surfaces 358. Conveyors 340 are pivotally coupled to endless support 370 about the axes of pins 350 to enable conveyors 340 to pivot between a first extended position and a second retracted position. Each crop conveyor 340 includes a cam follower 352 having a surface 356 configured for engaging cam 342.

Cam 342 is a generally elongated parabolic bar eccentrically mounted between drive wheel 366 and follower wheel 368 for engagement with conveyors 340 while conveyors 340 are carried by reciprocating support 338 rearwardly from front end 54 towards rear end 56. Cam 342 defines a cam surface 354 for engaging cam follower surface 356 of cam follower 352. Cam surface 354 includes an arcuate ramp segment 359 and an extension segment 360. Ramp segment 359 arcuately extends about the axis of follower wheel 368 proximate front end 54 and engages cam follower surface 356 of cam follower 352 to pivot crop conveyors 340 in a clockwise direction into the first extended position. Extension segment 360 generally extends rearwardly from ramp segment 359 towards rear end 56 generally parallel to the longitudinal axis of row unit 24. As best shown by FIG. 18, extension segment 360 of cam surface 354 engages cam follower surface 356 of cam follower 352 to maintain conveyors 340 in the first extended position while reciprocating support 338 carries conveyors 340 from front end 54 towards rear end 56. As a result, cam 342 engages cam follower 352 to maintain conveyors 340 in the extended position while conveyors 340 engage crops and carry crops rearwardly along row unit 24 from front end 54 towards rear end 56.

Cam 343 is a generally rigid member defining cam surface 360 for engaging crop conveying surface 358 of each crop conveyor 340. In particular, cam 343 is supported by frame 18 proximate rear end 56 so that cam surface 360 engages crop conveying surface 358 to pivot each crop conveyor 340 in a counter-clockwise direction from the first extended position to the second retracted position as best shown by FIG. 19. Because cam 342 is supported by frame 18 eccentric to the axes of drive wheel 366 and follower wheel 368, each crop conveyor 340 pivots in a counter-clockwise direction upon engaging cam 343 and remains in the second retracted position while reciprocating support 338 carries each conveyor 340 from rear end 56 towards front end 54, where each crop conveyor 340 is returned to the first extended position upon engaging ramp segment 359. Because crop conveyors 340 remain retracted while reciprocating support 38 carries conveyors 340 from rear end 56 towards front end 54, conveyors 340 do not substantially extend outward so as to interfere with conveyors of adjacent gatherers along adjacent row units. As a result, gatherers 23, 25, 27 and 29 and row units 22, 24, 26 and 28 may be more closely spaced together to better accommodate narrower crop row spacings with improved harvesting efficiency.

Although the present invention has been described with reference to preferred embodiments, workers skilled in the art will recognize that changes may be made in form and detail without departing from the spirit and scope of the invention.

What is claimed is:

1. A crop header having a front end and a rear end adapted for being coupled to a harvesting machine, the crop header comprising:

a frame;

a reciprocating support coupled to the frame along a longitudinal axis extending between the front end and the rear end; and a crop conveyor pivotally coupled to the reciprocating support so as to pivot between a first position at which the crop conveyor extends at a first angle relative to the longitudinal axis and a second position at which the crop conveyor extends at a second angle different from the first angle relative to the longitudinal axis.

2. The crop header of claim 1 wherein the reciprocating support alternately moves the crop conveyor in a first rearward direction and a second forward direction and wherein the crop conveyor pivots between a first extended position during movement in the first rearward direction and a second retracted position during movement in the second forward direction.

3. The crop header of claim 2, including:

means for maintaining the conveyor in the first extended position during movement in the first rearward direction.

4. The crop header of claim 2 including:

means for maintaining the conveyor in the second retracted position during movement in the second forward direction.

5. The crop header of claim 2 wherein the reciprocating support moves between a first forward end and a second rearward end, and wherein the crop conveyor includes:

means at the first forward end for pivoting the crop conveyor to the first extended position and means at the second end for pivoting the crop conveyor to the second retracted position.

6. The crop header of claim 1 wherein the reciprocating support includes:

a first wheel rotatably coupled to the frame about a first axis;

a second wheel rotatably coupled to the frame about a second axis;

an endless support in engagement with the first and second wheels for being rotated about the first and second axes, the endless support carrying the crop conveyor.

7. The crop header of claim 1 including:

means for selectively pivoting the crop conveyor.

8. The crop header of claim 7 wherein the means for selectively pivoting includes:

a cam follower surface coupled to the crop conveyor; and a cam surface coupled to the frame for engaging the cam follower surface to selectively pivot the crop conveyor.

9. The crop header of claim 8 wherein the crop conveyor is pivotally coupled to the support about a pivot axis and wherein the cam surface extends in a plane parallel to the pivot axis.

10. The crop header of claim 8 wherein the crop conveyor is pivotally coupled to the support about a pivot axis and wherein the cam follower surface extends from the crop conveyor eccentric to the pivot axis.

11. The crop header of claim 1 wherein the frame supports the reciprocating support in a vertical plane and wherein the crop conveyor pivots about a vertical axis.

12. The crop header of claim 1 wherein the frame supports the reciprocating support in a horizontal plane and wherein the crop conveyor pivots about a vertical axis.

13. The crop header of claim 1 wherein the frame supports the reciprocating support along a longitudinal axis and wherein the crop conveyor is pivotally coupled to the support so as to pivot between a first position in which the crop conveyor extends oblique to the longitudinal axis and a second position in which the crop conveyor extends parallel to the longitudinal axis.

14. The crop header of claim 1 wherein the frame supports the reciprocating support along a longitudinal axis and wherein the crop conveyor is pivotally coupled to the support so as to pivot between a first position in which the crop conveyor extends perpendicular to the longitudinal axis and a second position in which the crop conveyor extends non-perpendicular to the longitudinal axis.

15. The crop header of claim 1 including a row unit, wherein the frame supports the reciprocating support along the row unit.

16. The crop header of claim 15 wherein the row unit includes:

at least one stripper plate supported by the frame below the crop conveyor; and at least one stalk roll rotatably supported by the frame below said at least one stripper plate, wherein the stalk roll pulls a plant stalk into engagement with the stripper plate to separate a plant portion from a respective plant stalk.

17. The crop header of claim 1 wherein the endless support rotates about a pair of spaced axes and wherein the cam surface comprises a parabolic member eccentrically supported by the frame relative to the pair of axes.

18. The crop header of claim 1 wherein the endless support extends about a first axis and about a second axis spaced from the first axis, the crop header further including:

a first crop conveyor engaging surface supported by the frame proximate the first axis for pivoting the crop conveyor in a first direction; and a second crop conveyor engaging surface supported by the frame proximate the second axis for pivoting the crop conveyor in a second opposite direction.

19. The crop header of claim 1 including:

a crop channeling surface supported by the frame adjacent the crop conveyor, wherein the channeling surface funnels and maintains crops in engagement with the crop conveyor.

20. A crop header for a harvesting machine, the crop header comprising:

a frame;

a row unit supported by the frame, the row unit having first and second spaced apart ends;

a reciprocating support for reciprocating between the first and second ends along a longitudinal axis; and a plurality of crop conveyors pivotally coupled to the reciprocating support so as to pivot between a first extended position at which the crop conveyors extend at a first angle relative to the longitudinal axis and a second retracted position at which the crop conveyors extend at a second angle different from the first angle relative to the longitudinal axis.

21. A crop header for a harvesting machine, the crop header comprising:

a frame;

a row unit supported by the frame, the row unit having first and second spaced apart ends;

a reciprocating support for reciprocating between the first and second ends;

a plurality of crop conveyors pivotally coupled to the reciprocating support; and at least one cam supported by the frame for engaging the crop conveyors to selectively pivot the crop conveyors into a first extended position proximate the first end and to selectively pivot the crop conveyors into a second retracted position proximate the second end.

22. A crop header for a harvesting machine, the crop header comprising:

a frame;

a reciprocating support coupled to the frame and having a length; and a plurality of crop conveying fingers extending from the support at a plurality of spaced locations along the length of the support, each finger having an end pivotally coupled to the reciprocating support.

23. The crop header of claim 22, wherein each of the plurality of crop conveying fingers pivot relative to the reciprocating support independent of one another.

\* \* \* \* \*